Patented Oct. 17, 1922.

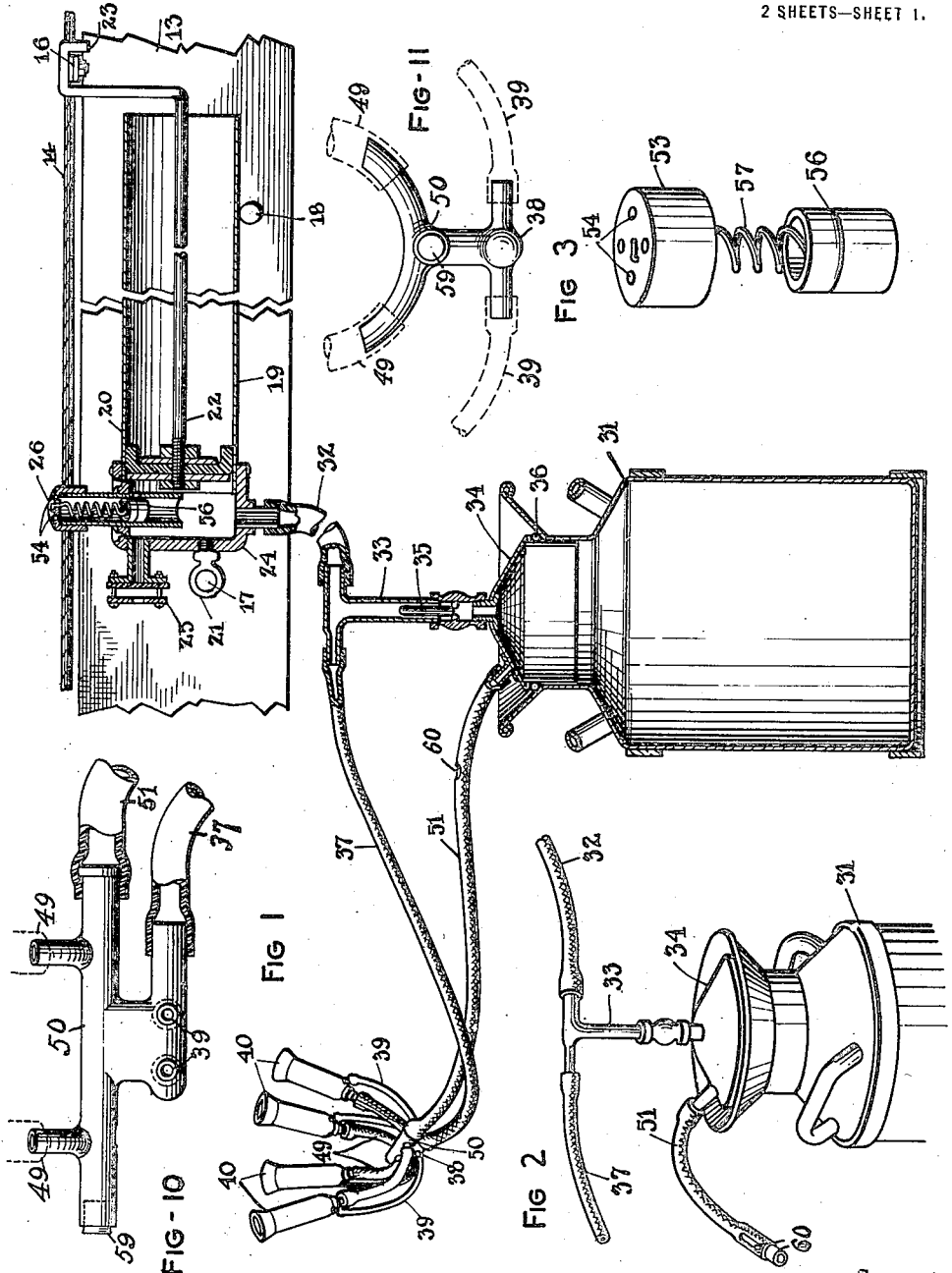

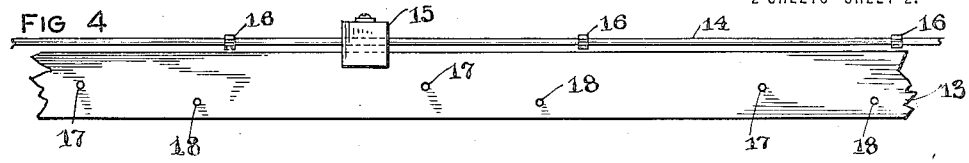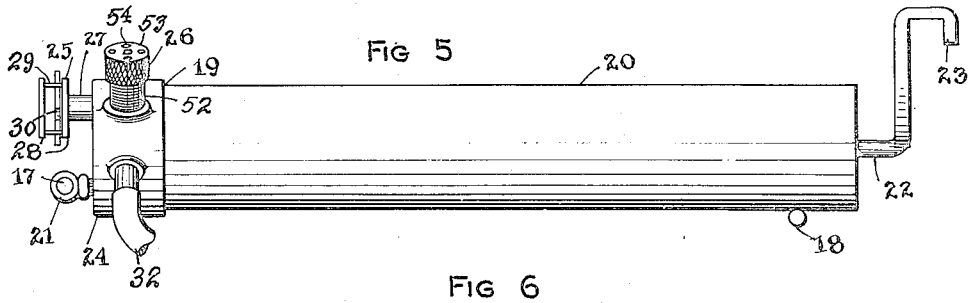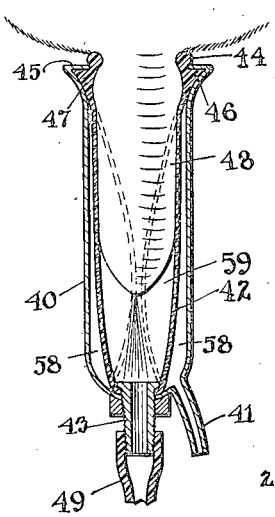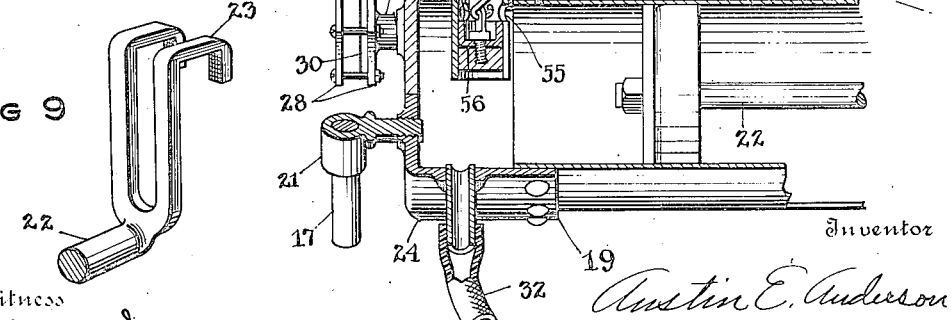

1,432,654

UNITED STATES PATENT OFFICE.

AUSTIN E. ANDERSON, OF RANDOLPH, NEW YORK.

MILKING MACHINE.

Application filed June 6, 1919, Serial No. 302,210. Renewed August 26, 1922. Serial No. 584,574.

*To all whom it may concern:*

Be it known that I, AUSTIN E. ANDERSON, a citizen of the United States, residing at the village of Randolph, in the county of Cattaraugus and State of New York, have invented certain new and useful Improvements in Milking Machines, of which the following, taken in connection with the accompanying drawings, is a specification.

The invention relates to milking machines; and the object of the improvement is to provide a simple, durable and reliable milking mechanism which extracts the milk from the cow in a natural manner so that the milk secretion is constant and comfortable for the cow, and quickly attained; and the invention consists in the combination and arrangement of the parts as hereinafter described and claimed.

In the drawings, Figure 1 is a vertical sectional view of the milking mechanism including the milk can showing a perspective view of the teat cups and the tubular connection thereto. Fig. 2 is a perspective view of the upper portion of the can or milk receptacle showing the tubular air connection thereto from the milking pump and teat cups. Fig. 3 is a perspective view of the adjustable spring valve which controls the strength of the suction in the teat cups. Fig. 4 is an elevation of the top bar of the stanchion showing the actuating cable supported along the top of the same and the spaced pins for the removable support of the milking pump. Fig. 5 is an elevation of the milking pump; and Fig. 6 is an elevation of the same as supported upon the top bar of the stanchion showing the actuating cable removably engaged by the piston of the pump, the cable being shown in section; and Fig. 7 is a sectional view of the operating end of the milking pump at line 7—7 in Fig. 6, the upper portion of the line and cylinder being turned to a vertical position. Fig. 8 is a sectional view of the preferred form of teat cup in position upon the cow's teat. Fig. 9 is a perspective view of the preferred form of removable hook for attaching the milking pump piston to the actuating cable. Fig. 10 is a side, and Fig. 11 an end elevation of the preferred form of branching union or connector for the air and milk tubes connecting the milking pump and milk can to the teat cups. Fig. 12 is a vertical sectional view of the top of the milk container showing a modification of the equalizing valve as arranged for attachment on the lid of the milk container.

Like characters of reference refer to corresponding parts in the several views.

The numeral 13 designates the top bar or head of the stanchion, which has the actuating cable 14 supported thereon in suitable overhanging guide blocks 15 through which the cable 14 is slidably mounted. The cable 14 has the cleats 16 clamped thereon at spaced intervals and in spaced relation to the pins 17 on the stanchion head 13.

The cleats 16 and pins 17 and 18 are provided for the support of a milking pump 19. The pin 18 supports the under side of the pump barrel 20 and the pin 17 is removably inserted through a hole in a projecting standard 21 on the end of the pump barrel 20. The milking pump 19 consists of the tubular barrel 20 which has the piston 22 slidably mounted therein to create the necessary suction for the milking process. The piston 22 has the double prong hook 23 on its outer end which extends up each side of the cable 14 and hooks over the cleats 16 to thereby impart a reciprocating motion to the piston 22 when the cable 14 is actuated. The pump 19 has the closed or capped head end 24, which has the outlet valve 25 and the suction equalizing valve 26 attached therein.

The outlet valve 25 consists of a tube 27 having a pair of plates 28 held in spaced relation on a plurality of bolts 29 enclosing therebetween the movable valve plate 30 so that when the piston 22 is drawn away from the said valve by the cable 14, the suction will draw the valve plate 30 against the open end of the tube 27 and thereby close the same, and when the piston 22 moves in the opposite direction, the plate 30 is moved away from the mouth of the tube 27 by the outward pressure, permitting the air to escape through said tube.

The milking pump 19 is connected to the milk can or receptacle 31 by the main flexible suction tube 32 by attachment to a metallic T-shaped tube 33 mounted on the lid 34 of the can 31, which tube 33 has the check weight valve 35 therein. The lid 34 merely rests upon the gaskets 36 relying upon the partial vacuum created to seal the can from atmospheric pressure during the milking process.

A suction tube 37 attaches to one end of the T-shaped tube 33 and connects to the metallic air connector or union 38, which has the tubes 39 extending to the lower ends of the four teat cups 40, to which the tubes 39 are connected by the tubular metal connection 41 to the space 58 around the tubular rubber lining 42. The lining 42 is attached by a tubular plug or milk duct 43 in the lower end of the teat cup 40, the tube 43 having a flanged upper end sufficient to hold the lower end of the tubular rubber lining 42. The upper end of the lining 42 is provided with a round bead or ring 44 around the mouth of the lining 42 for the reception of the teat 48 therein.

The cup 40 has the inwardly projecting flange 45 which provides an angular annular recess 46 beneath the flange 45 within which a smaller angular annular shaped projection 47 is provided around the upper end of the lining 42 just below the bead ring 44. The mouth of the rubber lining 42 formed by the bead ring 44 is of such size that it may be stretched over the teat 48 clamping closely around the upper end of said teat against the bag so that the vacuum suction holds the teat cup firmly in position as soon as a partial vacuum is formed by the pump 19. The lower end of the teat cups 40 are connected by tubes 49 to a central milk connector or union 50 which in turn is connected by a tube 51 to the milk can 31.

The suction equalizing valve 26 on the pump 19 consists of the tube 52 which extends within the cap 24 of the pump barrel 20 and has the knurled adjustable screw cap 53 as a partial closure for its outer end to adjust the spring 57 in relation to the piston 56. The cap 53 has the air inlets 54 and the tube 52 has the holes 55 within the cap 24. A piston head 56 is slidably mounted within the tube 52 and connected to the upper end of the same by a spring 57. The piston head 56 in the suction equalizing valve 26 normally stands above or outside of the holes 55 in the tube 52. The screw cap 53 is preferably knurled on its outer surface so that it may be easily adjusted backward and forward as it is desired to equalize the suction pressure by weakening or strengthening the same, the cap 53 being moved outward to strengthen the suction pressure, and inward to weaken said pressure.

The operation of the milking machine is as follows: The milk can 31 has the teat cups 40 and milking pump 19 attached thereto by the tubes as described. The pump 19 is placed on the supporting pins 17 and 18 on the stanchion head 13 and connected to the reciprocating cable 14 by placing the double hook 23 over the cleats 16 thereby starting the suction pump 19. The draw of the piston 22 in the barrel 20 of the pump 19 lifts the check weight valve 35 and draws the air from the can 31 and from the entire system of connective air tubes and the space 58 between the linings 42 and the inner walls of the teat cups 40 thereby creating a partial vacuum in said system and milk can.

A few strokes of the pump, about four, are sufficient to remove enough air from the can 31 and said connective system to enable the operator to place the teat cups 40 on the teats 48 and thereby start the process of milking. As the piston 22 draws the air from the can 31 and the connective system to the teats including the teat cups 40, said draw of the air or suction will draw the lining 42 back against the inner wall of the teat cups 40, the suctional draw of the air being greater on the outside of the lining 42 in the space 58 than within the same. This permits the suction from the partial vacuum created within the can 31 to draw the milk direct from the teat 48, the milk being drawn through the tubes 49, connector 50 and tube 51 to the milk can 31 and showing in the glass tube 60 in tube 51.

As the piston 22 is drawn outward in order to withdraw the air from the can 31 and the connective system and teat cups 40, the vacuum suction within the head 24 of the pump 19 often becomes too great. Such excess suction draws the piston 56 inward until it is within the holes 55 in the tube 52 sufficiently to permit the air under atmospheric pressure to rush in through the ports 54 and holes 55 sufficiently to equalize said excess suction. The controlling spring 57 of the piston 56 is adjusted to the desired suction for the various types of hard and easy milkers which will always be found among cows, thereby equalizing said suction by admitting just the necessary amount of air. It is apparent that this gives a very simple control for the vacuum suction so that an operator can quickly and easily adjust the same according to the needs of each individual cow.

As the piston 22 starts back toward the head of the pump 19 in its reciprocative movement, the check weight valve 35 is relieved and drops onto its seat thereby sealing the can 31 thereby preserving the partial vacuum therein and in the tubes 49 and 51 and the space within the linings 42 of the teat cups with the draw on the teats. It will be appreciated that there is still, however, a partial vacuum within the pump 19 and the remainder of the suction system which draws the piston 22 back a short distance in connection with the force exerted by the cable 14 until the air within the piston cylinder is equalized with atmospheric pressure by the inlet of the air through the equalizing valve 26. Any pressure above atmospheric pressure caused by the return movement of the piston 22 as drawn by the cable 14 is relieved by the outlet valve 25. As the suction pressure becomes weaker within the pump head 19 and tubes 32 and 37 and the space 58 between the lining 42 and the teat cup 40 than the suction from the partial vacuum retained in the can 31 and within the space 59 in the lining 42, the latter suction will cause the drawing inward of said lining 42 to the position shown in dotted outline in Fig. 8, said linings being drawn into contact with one another thereby cutting off the suction of the semi-vacuum on the teat and massaging and pressing the blood back within the same and relieving the nerves, preparatory to the repetition of the milking process as hereinbefore outlined.

An air inlet or equalizing valve similar to valve 26 may be placed in different parts of the milking mechanism, as for example on the lid 34 of the closed milk container 31, as shown in the modification in Fig. 12, in which a spring valve 61 is attached in a tube 62 on the lid 34 and connected to the tubing 33, so that too heavy an air suction will draw in the air through the ports 63 in tube 62 and into the connective system thereby relieving the air pressure in very much the same manner in which the air pressure is relieved by the equalizing valve 26 shown in the head of the pump 19, the tube 62 having the adjustable cap 64. The position in the pump head for the equalizing valve is preferred because it removes said equalizing valve as far as possible from the dirt and moisture which would be apt to render the valve defective; also the position in the pump head places said equalizing valve at the point of production of the suction vacuum so that it is at the most sensitive point in the suction system and hence can be more delicately and accurately controlled, so as to regulate the suction to each individual cow according as she is a hard or easy milker.

I claim as new:

1. A milking machine comprising a single pump and means for actuating the same, a covered milk container, rubber lined teat cups to provide two compartments therein, a single interrupted and direct tubular connection between said pump and the pressure compartment of the cup, a valved branch connection between the tubular connection and the container, and a connection between the teat compartment and the container, said milking machine having an adjustable air inlet in the pump head to regulate the degree of suction pressure.

2. A milking machine comprising a teat cup having a flexible-walled teat compartment and an atmospheric pressure compartment, a single pump, a milk container, a direct tubular connection continuous between the atmospheric pressure compartment and the pump, and a direct tubular connection continuous between the first connection and milk container, and a direct tubular connection continuous between the container and the teat compartment of the cup.

3. A milking machine comprising a teat cup having a flexible-walled teat compartment and an atmospheric pressure compartment, a milk container, an uninterrupted passage between the teat compartment and said container, a tubular connection continuous and uninterrupted between the pressure compartment and the container, and means communicating with the tubular connection for producing alternate atmospheric and lesser pressure variations therein.

4. A milking machine comprising a teat cup having a flexible-walled teat compartment and an atmospheric pressure compartment, a milk container, an uninterrupted passage between the teat compartment and said container, a tubular connection continuous and uninterrupted between the pressure compartment and the container, a pump having a single duct connected to the tubular connection, a variable pressure intake valve in the pump, means for adjusting the valve to open under a predetermined pressure, and an exhaust in the pump said intake and exhaust providing the sole means of communication with the atmosphere.

5. A milking machine comprising a teat cup having a flexible-walled teat compartment and a fluid pressure compartment, a pump cylinder having a freely opening exhaust valve and a variable pressure-opening intake valve, a plunger operable in the cylinder to create a suction whereby the exhaust valve will close and the intake valve will function, an uninterrupted connection between the cylinder and pressure compartment of the teat cup, a container, a connection between the teat compartment and the container, and a valved connection between the container and the pump cylinder for establishing communication between the latter and the container upon the suction stroke of the plunger and for closing communication between the cylinder and the container upon the pressure stroke of the plunger whereby the vacuous condition is retained within the container and the teat compartment upon the pressure stroke of the plunger and the vacuous condition within the pressure compartment of the teat cup relieved through the cylinder exhaust valve.

6. A milking machine comprising in its entirety, a milk container, a teat cup having a flexible-walled teat compartment and an adjacent fluid pressure compartment, a pump connected directly to the container, a direct connection between the container and the cup for maintaining a continuous suction within the teat compartment, a check valve in the connection between the pump and the container, the latter connection being uninterrupted between the check valve and container, and a direct and uninterrupted connection between the pump and the fluid pressure compartment for intermittently varying the fluid pressure in said latter compartment to cause a corresponding flexing movement of the wall of the teat compartment.

7. A milking machine comprising a teat cup having a flexible-walled teat compartment and an adjacent fluid pressure compartment, a pump directly and uninterruptedly connected to the fluid pressure compartment, a milk container connected directly to the teat compartment, a connection between the pump and the milk container, and a check valve in the connection for retaining the vacuous condition in the container during the pressure stroke of the pump and for opening during the exhaust stroke of the pump, the weight of the valve causing a greater vacuous condition in the teat compartment than in the fluid pressure compartment.

8. A milking machine comprising a pump and means for actuating the same to create a suction pressure, a covered milk container and tubular connection between said milk container and said pump, a checkweight valve in said connection to close said milk container when said pump is not in action, lined teat cups and tubular connection between the interior of the lining of said teat cups and said milk container, and a continuous and uninterrupted tubular connection between the exterior of said lining within said teat cups and said pump to operate said lining in a massaging movement by the action of the pump, and an adjustable air inlet valve on said pump to regulate the degree of suction pressure.

9. A milking machine comprising an actuating cable, spaced crosswise clamping bars on said cable, a suction pump removably mounted adjacent said crosswise clamping bars, a double hook on the outer end of the piston of said pump to removably engage over said clamping bars to actuate said pump by said cable, teat cups and a closed milk container having tubular connection to said pump to create a partial vacuum therein, and means of control for said partial vacuum.

In testimony whereof I have affixed my signature in the presence of two witnesses.

AUSTIN E. ANDERSON.

Witnesses:
C. V. SWANSON,
HAROLD FORSBERG.